2,773,061
Patented Dec. 4, 1956

2,773,061

PROCESS OF MAKING 4-(p-AMINOBENZENE-SULPHONYL) AMINO-PYRIMIDINES

Werner Loop, Hamburg-Lockstedt, Germany

No Drawing. Application May 22, 1953,
Serial No. 356,897

Claims priority, application Germany June 15, 1949

2 Claims. (Cl. 260—239.75)

This application is a continuation-in-part-application of my copending application Serial No. 167,486, filed June 10, 1950, for a process of making bis-(benzenesulphonyl)-4-aminopyrimidines and now abandoned.

The invention of the present application relates to a process of manufacturing 4-(p-aminobenzenesulphonyl)-aminopyrimidines. One of its objects is to provide an improved method by which a higher yield of the desired products is obtainable than has been possible with the methods hitherto known. Another object is to prepare the products in question with a high degree of purity.

It has now been discovered that 4-(p-aminobenzenesulphonyl)-aminopyrimidines are obtainable in a very good yield and with a high degree of purity by reacting one mol of a dry 4-aminopyrimidine with about two mols of a dry p-acylamino-benzenesulphonic acid halide in the presence of an organic solvent free from hydroxyl groups and of about two mols of an acid binding agent consisting up to 100% of at least one dimethyl-monoalkyl-amin the alkyl group of which contains 1–4 carbon atoms the remaining part of the acid binding agent consisting of at least one other tertiary amine having at least the same capacity of binding hydrogen halides as the said dimethyl-monoalkyl-amin, and subjecting the reaction product thus obtained to a hydrolysis.

A preferred method of my invention comprises a process for the manufacture of 4-(p-aminobenzenesulphonyl)-2.6-dimethyl-aminopyrimidine which comprises reacting one mol of dry 4-amino-2.6-dimethyl-pyrimidine with about two mols of a dry p-acylamino-benzenesulphonic acid chloride in the presence of an organic solvent free from hydroxyl groups and of about two mols of an acid binding agent consisting up to 100% of at least one dimethyl-monoalkyl-amin the alkyl group of which contains 1–4 carbon atoms the remaining part of the acid binding agent consisting of a trialkylamine whose alkyl groups do not contain more than 4 carbon atoms each at least two alkyl groups however containing more than one carbon atom, and subjecting the reaction product thus obtained to a hydrolysis.

While acetylaminobenzenesulphochloride and carbethoxyaminobenzenesulphochloride are the most preferred acylaminobenzenesulphochlorides used in the process according to the present invention, other acyl-compounds may also be used although less advantageously. Such other acylcompounds are, for instance, the propionyl, butyryl, valeryl and other lower aliphatic acid compounds or the benzoyl and other aromatic acid compounds.

The dimethyl-monoalkyl-amines to be used according to my invention comprise trimethylamine and the dimethyl-ethyl-dimethyl-propyl- and dimethyl-butyl-amines.

Other tertiary amines having the same capacity of binding hydrogen halides are for instance triethylamine, monomethyl-diethylamines, the monomethyl-di-propyl- and the monomethyl-di-butyl-amines. It is surprising that for instance triethylamin cannot be used in the process in question as the sole acid binding agent but that it gives good yields when used jointly with for instance trimethylamine as is shown by my invention.

The expression "about two mols" is intended to include the use of more than two mols the use of such an excess being without any disadvantage but otherwise unnecessary.

By my invention it is proved that the reaction between sulphochlorides and 4-aminopyrimidines is greatly influenced by the quality and the quantity of the acid binding agents used, that such commonly used acid binding agents as pyridine and triethylamine are practically useless in this specific reaction and that almost theoretical yields of an intermediate product that can be hydrolyzed without intermediate purification are obtainable when proceeding according to my invention.

As solvents being free from hydroxyl groups there can be used for instance methylenchloride, ethylenchloride, benzene, toluene and similar other solvents.

My invention is illustrated by but not limited to the following examples:

*Example 1*

To 52.0 grams of dry acetylsulphanilic acid chloride are added 12.3 grams of 4-amino-2.6-dimethylpyrimidine and 200 ccm. of methylenchloride. While agitating and cooling, but excluding water, 65 ccm. of a water-free benzene trimethylamine solution, containing 13.0 grams trimethylamine, are introduced into the mixture at the rate of consumption. Thereafter agitation is continued for two hours whereupon the organic solvent is distilled off from the precipitated crystalline mass. The distillation residues are diluted with 300 ccm. of water and thoroughly mixed whereby care is being taken that the aqueous solution at all times reacts neutral when tested against litmus. After cooling, the solution is filtered and the filter residues washed with plenty of water. The yield amounts to 90–100%. The product thus obtained is hydrolysed with caustic soda lye whereby the 4-(p-aminobenzenesulphonyl)-amino-2.6-dimethylpyrimidine is obtained in a high yield and purity.

*Example 2*

16.5 grams of 4-amino-2.6-diethyl-5-methylpyrimidine and 200 ccm. of methylene chloride are added to 52.0 grams of water-free acetylsulphanilic acid chloride. While agitating and cooling, but excluding water, 65 ccm. of a water-free benzene trimethylamine solution, containing 13.0 grams of trimethylamine, are introduced into the mixture. After introduction of the trimethylamine, agitating is continued for a few hours whereupon the organic solvents are evaporated. The residues are then diluted with 300 ccm. water and the aqueous solution is agitated for 30 minutes while at the same time its temperature is raised to 50–60° C., care being taken that the solution at all times reacts neutral. The yield amounts to at least 90% of the theoretical yield. The product thus obtained can be hydrolysed as shown in Example 1 without any intermediate purification.

*Example 3*

13.7 grams of 4-amino-2-isopropylpyrimidine, 52.0 grams of dry acetylsulphanilic acid chloride, and 200 ccm. methylenchloride are mixed with 65 ccm. of a benzene solution of water-free trimethylamine, containing 13.0 grams trimethylamine, while excluding water and agitating and cooling. The further procedure is similar to the one described in Examples 1 and 2.

*Example 4*

12.3 grams (0.1 mol) finely powdered 4-amino-2,6-dimethylpyrimidine and 46.8 grams (0.2 mol) dry p-acetylsulphanilic-acid chloride are mixed while stirring with 200 ccm. methylene chloride. To this mixture there are added while agitating, weakly cooling and excluding water 3.0 (0.05 mol) trimethylamine dissolved in 15 ccm. benzene and then 15.5 grams (approximately 0.15 mol) dry triethylamine.

After the addition of the tertiary amines, agitation is continued for six hours whereupon the organic solvents are evaporated as far as possible. The distillation residues are heated with 300 ccm. water until the organic solvents are completely driven off. The aqueous reaction mixture including the solid, almost colourless precipitate is kept for 12 hours in an icebox and then filtered. The filter residue is thoroughly washed with water and then exhaustively extracted with a 5% soda lye. The residue thus obtained consists of bis-(p-acetaminobenzenesulphonyl)-4-amino-2.6-dimethylpyrimidine. By neutralising the mother lye there are obtained further quantities of mono-(p-acetaminobenzenesulphonyl)-4-amino-2.6-dimethylpyrimidine.

By uniting the said intermediate products and boiling with 6 times the volume of 10% soda lye and then neutralising the reaction mixture there is obtained the 4-(p-aminobenzenesulphonyl)-amino-2.6 - dimethylpyrimidine having a melting point of 239° C.

*Example 5*

12.3 grams (0.1 mol) finely powdered 4-amino-2.6-dimethylpyrimidine and 46.8 grams (0.2 mol) dry p-acetylsulphanilic-acid chloride are mixed while stirring with 200 ccm. methylene chloride. To this mixture there are added while agitating, weakly cooling and excluding water 3.0 grams (0.05 mol) trimethylamine dissolved in 15 ccm. benzene and then 11.0 grams (about 0.15 mol) dimethylethylamine dissolved in 15 ccm. benzene all substances being as water free as possible. The reaction mixture is agitated for 6 hours at room temperature and then worked up as described in Example 1. Hydrolysed according to the method of Example 1, the intermediate-compound yields 4-(p-amino-benzenesulphonyl)-amino-2.6-dimethylpyrimidine.

*Example 6*

12.3 grams (0.1 mol) finely powdered 4-amino-2.6-dimethylpyrimidine and 46.8 grams (0.2 mol) dry p-acetylsulphanilic-acid-chloride are mixed while stirring with 100 ccm. methylene chloride. To this mixture are added while agitating and excluding water 3.0 grams (0.05 mol) trimethylamine dissolved in 15 ccm. benzene and then 13.4 grams (approximately 0.15 mol) dry diethyl-monomethyl-amine dissolved in 15 ccm. benzene. After agitating for 6 hours at room temperature the reaction mixture is worked up as described in Example 1. Hydrolysed according to the method of Example 1, there is obtained the 4-(p-aminobenzenesulphonyl) - amino - 2.4 - dimethylpyrimidine in a high yield and with a pure quality.

I claim:

1. A method of manufacturing 4-(p-aminobenzenesulphonyl)-aminopyrimidines, comprising the steps of reacting one mol of a dry 4-amino-pyrimidine with about two mols of a dry p-acylaminobenzenesulphonic acid halide in the presence of an organic solvent free of hydroxyl groups and in the further presence of about two mols of trimethylamine, thereby forming a reaction product; and subjecting said reaction product to hydrolysis.

2. A method of manufacturing 4-(p-aminobenzenesulfonyl)-amino-2,6-dimethylpyrimidine, comprising the steps of reacting one mol of dry 4-amino-2,6-dimethylpyrimidine with about two mols of dry p-acetylsulphanilic acid chloride in the presence of an organic solvent free of hydroxyl groups and in the further presence of about two mols of trimethylamine, thereby forming a reaction product; and subjecting said reaction product to hydrolysis.

References Cited in the file of this patent
UNITED STATES PATENTS

| | | |
|---|---|---|
| 2,429,184 | Hartmann et al. | Oct. 14, 1947 |
| 2,430,439 | Winnek et al. | Nov. 4, 1947 |
| 2,508,450 | Demolis | May 23, 1950 |

FOREIGN PATENTS

| | | |
|---|---|---|
| 495,650 | Belgium | May 31, 1950 |
| 547,976 | Great Britain | Sept. 21, 1942 |
| 582,149 | Great Britain | Nov. 6, 1946 |
| 886,009 | France | June 15, 1943 |
| 990,388 | France | June 6, 1951 |

OTHER REFERENCES

Ser. No. 334,990, Foldi et al. (A. P. C.), published Apr. 20, 1943.